E. J. TACKNEY.
METAL BUNG.
APPLICATION FILED FEB. 13, 1913.

1,085,180.  Patented Jan. 27, 1914.

WITNESSES.  INVENTOR.
  Edward J. Tackney
  Attorneys.

UNITED STATES PATENT OFFICE.

EDWARD J. TACKNEY, OF DETROIT, MICHIGAN, ASSIGNOR OF ONE-HALF TO HENRY C. WIEDEMAN, OF DETROIT, MICHIGAN.

METAL BUNG.

1,085,180. Specification of Letters Patent. Patented Jan. 27, 1914.

Application filed February 13, 1913. Serial No. 748,215.

*To all whom it may concern:*

Be it known that I, EDWARD J. TACKNEY, a citizen of the United States, residing at Detroit, county of Wayne, State of Michigan, have invented a certain new and useful Improvement in Metal Bungs, and declare the following to be a full, clear, and exact description of the same, such as will enable others skilled in the art to which it pertains to make and use the same, reference being had to the accompanying drawings, which form a part of this specification.

This invention relates to bungs or plugs for casks, barrels and other receptacles and has for its object a bung or plug provided with devices that expand to pack the bung or plug into a close relation with the receptacle. Expansion of the packing is effected by simply striking a blow with the hammer upon the expander member.

Figures 1, 2:
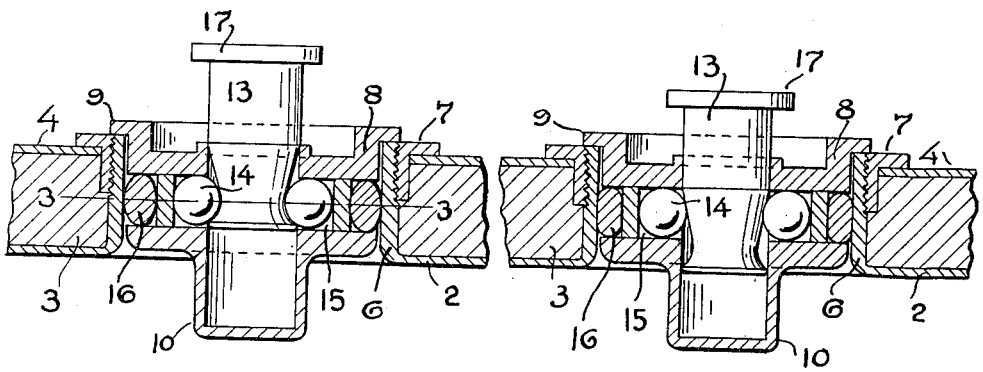
Figure 3:
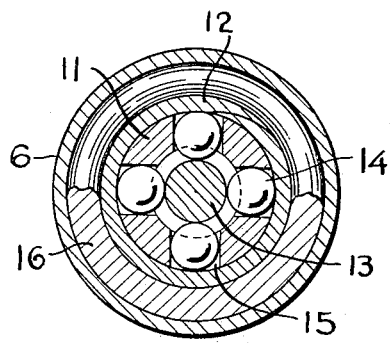
Figure 4:
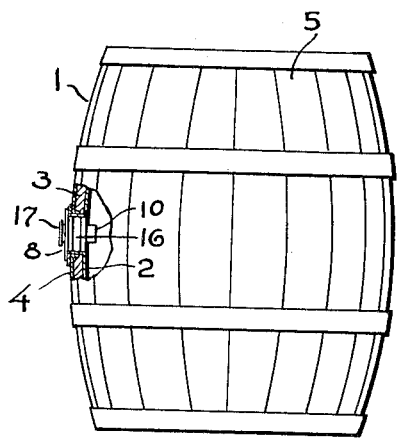

In the drawings:—Figure 1, is a section of the bung or plug with the expander member in position for allowing the insertion of the bung or plug into the receptacle. Fig. 2, is a similar section showing the expander member partly driven into the bung or plug. Fig. 3, is a section on the line 3—3 of Fig. 1, the rubber gasket being shown partly in elevation. Fig. 4, is an elevation of a cask or barrel broken away to show a bung in position.

1 represents a cask, barrel or other receptacle which is shown in the drawings in the form of an inner receptacle 2 that is packed with a filler material 3 and which has a sheathing 4 to protect the filler. This sheathing at the sides of the barrel is in the form of stave-sheaths 5. However, the particular form of a barrel is not material to the operation of my improved bung, but is merely described in order that the drawings may be understood. The invention may be used not only as a bung but as a plug in almost any place where a plug is employed.

The inner receptacle 2 has an opening formed by a cylindrical protuberance or nipple 6 which is screw-threaded at the exterior on the outer end. Upon these threads runs a bung bushing 7 which is flanged and which, when screwed in place, serves to complete the wall of the bung hole. I employ a peculiarly shaped bung or plug 8 which has a general cylindrical contour, but which is flanged with an annular flange 9 at one end to prevent the bung from passing completely through the bung hole. The opposite end of the bung has a cylindrical protuberance or socket 10 for the reception of the expander member when the same is driven into place to expand the packing members. This bung or plug is a single casting, but it consists of essentially two parts, one of which carries the flange 9 and the other of which carries the socket 10. These parts are connected by the integral posts 11 whose exterior sides form portions of a cylinder and about which lies the split ring 12 which is forced over the posts and into the groove formed by the posts and the two portions of the bung or plug. However, before this ring is assembled in place the expander member 13 which has the shape shown in the drawings is placed. This shape is cylindrical in general outline, but at a point about midway its ends, it tapers and assumes the shape of a frustum of a cone to a point at about the section line 3—3, when it again flares out in a somewhat conical figure, but a figure whose periphery is concaved, the concavity being formed by a segment of a circle which is substantially concentric to the anti-friction balls 14. These anti-friction balls are inserted in the ball cavities 15 which are formed by the posts 11 which are spaced from each other. Then the split ring 12 is forced over the posts and the balls and into the groove formed by these members together with the two parts of the bung or plug. The rubber gasket 16 is then stretched over one of the parts of the bung or plug and immediately contacts about the split ring 12. The bung or plug is in this way assembled and is ready for use. All that is now necessary is to insert the bung or plug in the hole and strike the expander member 13 with a hammer or mallet driving it into its socket. Inasmuch as that portion of the expander member adjacent the balls tapers, when the expander member is driven in, the balls are forced apart expanding the split ring 12 and thereby expanding the rubber gasket 16 into the manner shown in Fig. 2. The split ring 12 serves as a ball-container ring and the balls 14 serve as antifriction balls to allow of the easy forcing of the expander member into the socket and to facilitate its removal when it is desired to take out the bung or plug.

In Fig. 2 the action of the expander member is shown, although the condition of the rubber gasket is not in the extreme condition of compression and impact of the walls of the hole which it exhibits when the expander member is driven completely in. The expander member can be driven completely in with one blow of the hammer or mallet and it will readily be understood that the bungs may be very rapidly inserted into the casks or barrels.

I am aware that expanding bungs or plugs are not broadly new, but most of those that have already been in use are arranged to expand by screwing the expander member into a socket. This requires a longer operation and is not accomplished with the facility with which my expander member can be forced in and removed.

When it is desired to remove the bung or plug, it is only necessary to place an instrument under the disk portion or the head 17 of the expander member and to force this out. It will come out without a great deal of resistance on account of the anti-friction device which allows it to roll out.

What I claim is:—

1. A bung or plug, having in combination, a member for filling the bung opening, a packing member supported about the periphery of the first mentioned member, a plurality of radially forcible members supported within the packing member and by the first mentioned member, and an expanding member adapted to be driven into said first mentioned member to force the radially forcible members outward, the said radially forcible members giving the said packing member a radial thrust at a plurality of points to force the same into intimate relation with the bung hole walls, substantially as described.

2. A bung or plug, having in combination, a member for filling a hole formed with a central opening and an annular groove and arranged so that sockets or cavities connect the annular groove with the central opening, an expander member with a tapering end that may be driven in or forced out of the first-mentioned member, anti-friction balls in the cavities, a ring for containing the anti-friction balls located in the annular groove and a packing ring or gasket located in the annular groove and on the outside of the said ring, substantially as described.

3. A bung or plug, having in combination, a two-part member connected by posts which serve to form ball-containing cavities and having an annular groove, one of the parts of the said member containing a socket and the other a central opening, an expander member reciprocable through the said opening and into the socket, the said expander member tapered at one end, balls in the ball-containing-cavities and engaging with the plug, and a packing forced into contact with the walls of the hole by the separation of the balls, which is effected by driving the tapering expander member into its socket, substantially as described.

4. A bung or plug, having in combination, a member for filling an opening, comprising two parts connected by posts so as to form an annular groove and ball-containing sockets, one of the parts being provided with a central socket and the other with an opening, a tapering expander-member adapted to be forced through the opening and into the socket, balls contained in the said ball-containing-sockets and engaging with the said expander-member, a ring for holding the balls in the sockets and a packing contained in the annular groove and about the ring and adapted to be forced into contact with the walls of the hole by the separation of the balls which is effected by driving the tapering expander member into its socket, substantially as described.

In testimony whereof, I sign this specification in the presence of two witnesses.

EDWARD J. TACKNEY.

Witnesses:
  STUART C. BARNES,
  AMELIA C. KOEHN.

---

Copies of this patent may be obtained for five cents each, by addressing the "Commissioner of Patents, Washington, D. C."